(12) United States Patent
Han (10) Patent No.: US 11,768,817 B2
(45) Date of Patent: Sep. 26, 2023

(54) IN-MEMORY STORAGE CLUSTER CONSISTENCY AND AVAILABILITY

(71) Applicant: SAP SE, Walldorf (DE)

(72) Inventor: Bing Han, Shanghai (CN)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 17/504,234

(22) Filed: Oct. 18, 2021

(65) Prior Publication Data

US 2023/0124867 A1  Apr. 20, 2023

(51) Int. Cl.
*G06F 16/23* (2019.01)
*G06F 16/22* (2019.01)

(52) U.S. Cl.
CPC .......... *G06F 16/2255* (2019.01); *G06F 16/23* (2019.01)

(58) Field of Classification Search
CPC ...... G06F 16/2255; G06F 16/23; G06F 16/25; G06F 16/278
See application file for complete search history.

(56) References Cited

U.S. PATENT DOCUMENTS

| | | | |
|---|---|---|---|
| 9,875,272 B1 * | 1/2018 | Jhingran | G06F 16/2291 |
| 10,642,840 B1 * | 5/2020 | Attaluri | G06F 16/335 |
| 10,678,664 B1 * | 6/2020 | Lazier | G06F 3/0611 |
| 11,188,462 B2 * | 11/2021 | Huang | G06F 12/063 |
| 2016/0350392 A1 * | 12/2016 | Rice | G06F 16/2282 |
| 2019/0318117 A1 * | 10/2019 | Beecham | G06F 16/9024 |
| 2020/0242132 A1 * | 7/2020 | Persson | G06F 16/278 |
| 2021/0209077 A1 * | 7/2021 | Snellman | G06F 16/219 |

* cited by examiner

*Primary Examiner* — Merilyn P Nguyen
(74) *Attorney, Agent, or Firm* — SCHWEGMAN LUNDBERG & WOESSNER, P.A.

(57) ABSTRACT

In an example embodiment, shards of a database are each stored in in-memory storage as multiple redundant distinct shard instances, but rather than a leader-follower paradigm each redundant shard instance is independent from one another. Each shard contains only an odd number of shard instances, and the number of shard instances is greater than or equal to three. This helps to ensure that enough shard instances are available at any one time to service requests.

20 Claims, 9 Drawing Sheets

IN-MEMORY STORAGE CLUSTER CONSISTENCY AND AVAILABILITY

BACKGROUND

In database technology, sharding is a method of splitting and storing a single logical dataset in multiple databases. By distributing the data among multiple machines, a cluster of database systems can store larger datasets and handle additional requests without impacting performance. Sharding can be used, for example, if a dataset is too large to be stored in a single database. Additionally, many sharding strategies allow additional machines to be added to a cluster. Sharding allows a database cluster to scale along with its data and traffic growth.

Sharding is also sometimes referred to as horizontal partitioning, which comes from the traditional tabular view of a database. In such an organization, splitting a database vertically stores different columns in different databases, but splitting a database horizontally stores different rows in different databases.

A session service is a software service that allows users to manage various aspects of database sessions. Such a service often will use a database with strong data consistency and availability.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

One way for a session service to provide better performance is to utilize an in-memory database, such as HANA® from SAP SE of Walldorf, Germany. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access.

In such a system, the in-memory database is divided into shards, with each shard running on a separate computer system, known as a database node. In order to provide data availability to a session service, the in-memory database may provide for failover, since no system can guarantee 100% availability of all database nodes. This may be accomplished by having redundant shard instances running for each shard, each at different database nodes. For each shard, one of the shard instances is designated as the leader instance, with the other instances being follower instances. A separate sentinel service watches each of the instances and determines when one or more of them are inaccessible, either due to internal failure or communications issues. A database client wishing to access or modify data stored by a shard then communicates with the leader instance. The leader instance returns the requested data and synchronizes any alterations to the data to the follower instances.

This process works well when a follower instance goes down, but when a leader instance goes down there is a delay caused by the fact that the sentinel service must first detect the leader is down, then elect a new leader. Any users accessing the session service during this time may be logged out to this delay. Another technical problem is that the leader may crash suddenly, prior to the follower instances having been fully synchronized with the leader instance, which can cause data loss when the synchronization is perform asynchronously. Performing synchronous replication rather than asynchronous replication can solve this technical problem, but introduces another one in that the response time to access the database is slowed as the leader instance needs to wait to service requests until all follow instances have synchronized successfully.

In an example embodiment, shards of a database are each stored in in-memory storage as multiple redundant distinct shard instances, but rather than a leader-follower paradigm, each redundant shard instance is independent from one another. Each shard contains only an odd number of shard instances, and the number of shard instances is greater than or equal to three. This helps to ensure that enough shard instances are available at any one time to service requests.

Figure 1:
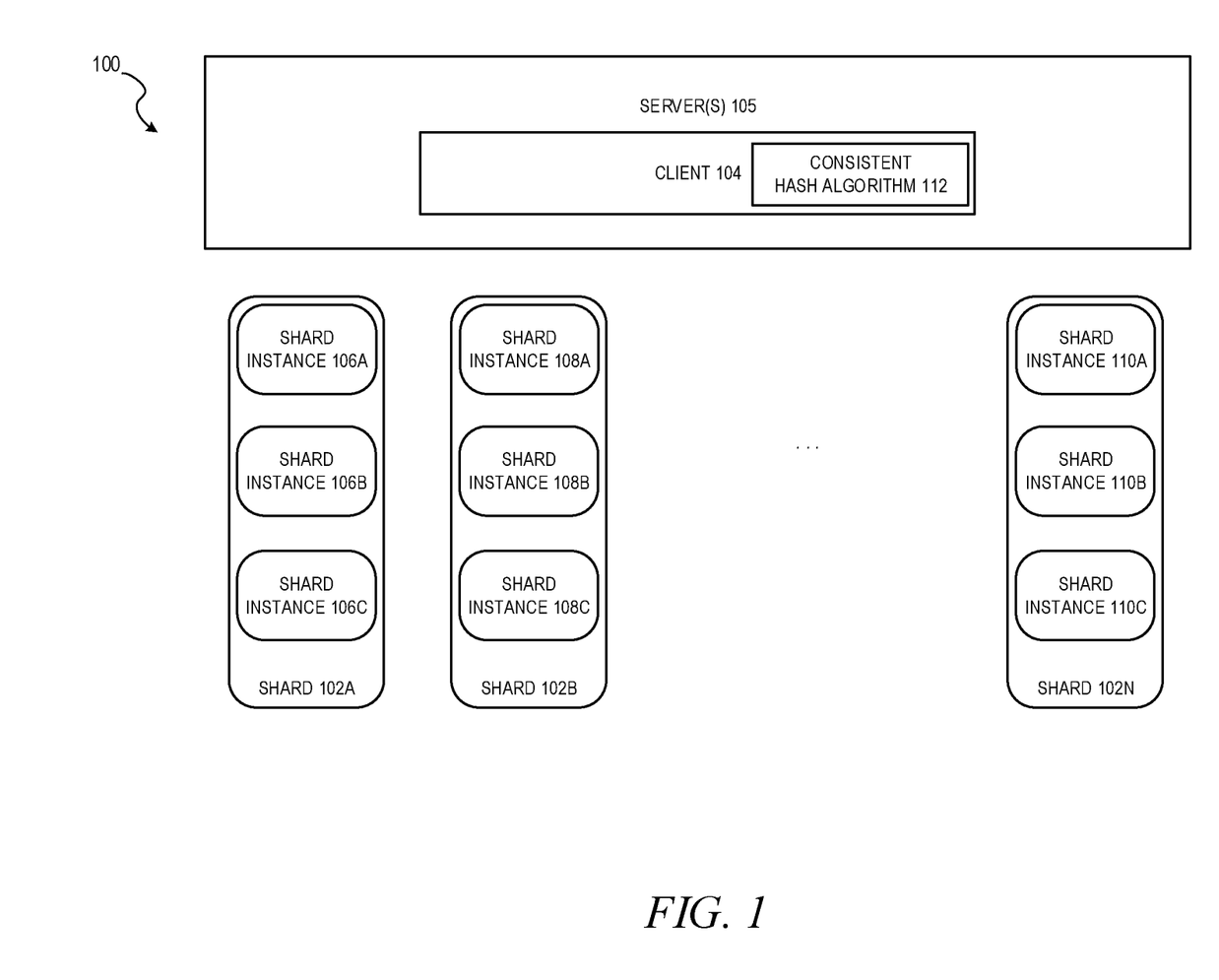
FIG. 1 is a block diagram illustrating an in-memory database cluster structure, in accordance with an example embodiment.

FIG. 1 is a block diagram illustrating an in-memory database cluster structure 100, in accordance with an example embodiment. The cluster structure 100 may include multiple shards 102A-102N. Each shard 102A-102N is a logical group of in-memory storage, accessible to a client 104 via one or more servers 105. Each shard 102A-102N also contains an odd and greater than three number of shard instances 106A-106C, 108A-108C, 110A-110C. Each shard instance is a singleton in-memory storage and individual (i.e., not directly connected to the others).

In an example embodiment, the in-memory storage is key-value storage. A key-value storage stores data as a collection of key-value pairs in which a key serves as a unique identifier. Key-value databases are highly partitionable and allow horizontal scaling at scales that other types of databases cannot achieve. In the present case, the value will contain a timestamp for each shard instance. The timestamp is used for data versioning. In other words, the timestamp is indicative of a version of the shard instance. This versioning is used to ensure data consistency, as will be described in more detail later. In an example embodiment, the timestamp is a Long type, so it will take 8 bytes. The version (timestamp) can be appended to the data body on the client-side when the client sends the value to a shard (puts the value to the cluster). The version will be dropped on the client-side when the client receives data from the shard (gets the value from the cluster). As such, the version itself does not impact the data body.

In an example embodiment, a hashing algorithm is used to ensure consistent hashing to choose which shard to send a request from a client. More particularly, the client 104 uses a consistent hash algorithm 112 to hash a key, and this key is appended to the request sent from the client and used by the one or more servers 105 to determine where to send the request. This is used for both read and write operations. In an example embodiment where the client 104 is a session service client, the key may be a session identification. In another example embodiment, the key may be a client identification.

In an example embodiment, the consistent hash algorithm 112 is identical on each client 104. This aids in load balancing as, depending upon the selection of the key, the load balancing algorithm (such as a round-robin scheme) can be implemented in the consistent hash algorithm 112.

Consistent hashing is a kind of hashing such that when a hash table is resized, only n/m keys need to be remapped on average, where n is the number of keys and m is the number of slots. In contrast, in traditional hash tables, a change in the number of array slots causes nearly all keys to be remapped because the mapping between the keys and the slots is defined by a modular operation. Contemporary consistent hashing may be performed via a consistent hashing ring, in which the output range of a hash function is treated as a fixed circular space (i.e., a "ring"), with the largest hash value wrapping around to the smallest hash value. Each node in the system is assigned an ID value within this space which represents its identity on the ring. Each object, which can be a computing process such as a database request, is also assigned an object ID in the same space. To assign the object to a node, the object is assigned to the node whose ID is immediately before or after the object's ID.

In another example embodiment, the servers 105 may also use another copy of the consistent hash algorithm 112 to monitor client interactions and properly assign shards.

Figure 2:
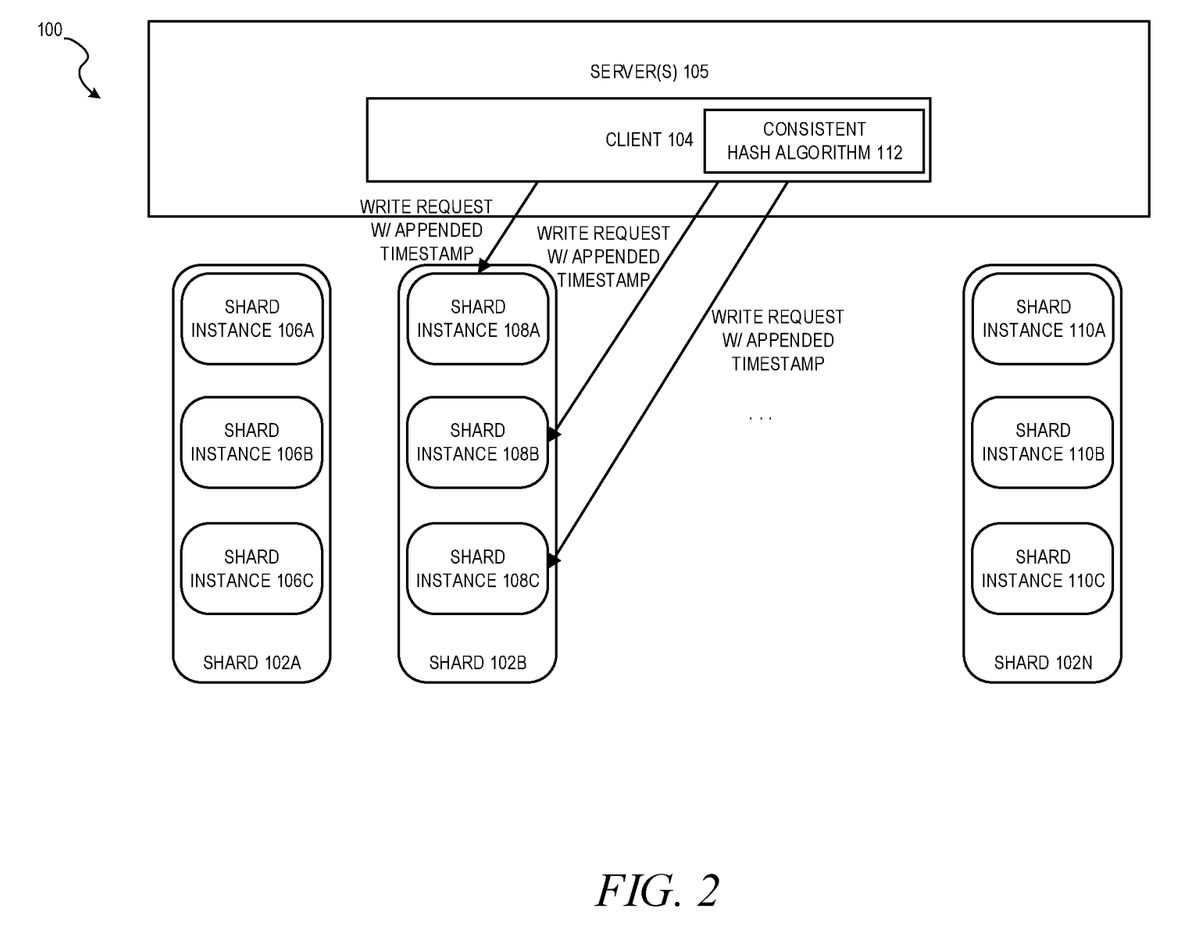
FIG. 2 is a block diagram illustrating an in-memory database cluster structure during a put operation, in accordance with an example embodiment.

FIG. 2 is a block diagram illustrating an in-memory database cluster structure 100 during a put operation, in accordance with an example embodiment. A put operation is one where the client 104 adds a value to a database (data sent to the database for storage). Here, the client 104 uses consistent hash algorithm 112 to determine that shard 102B should receive the operation. Client 104 appends a timestamp to the data body and sends it to each shard instance 108A-108C in shard 102B in parallel, since there is no leader/follower setup. By sending the operations in parallel, this means that the data in the data body will be replicated in the shard 102B if all shard instances 108A-108C process the request successfully. The client 104 is aware of the existence of and addresses of the shard instances 108A-108C by virtue of knowing the entire cluster structure, which may be important from an external source. In another example embodiment, the existence of and addresses of the shard instances 108A-108C may be obtained at runtime by querying an external source.

Processing the put operations involves modifying the corresponding shard instance 108A-108C to reflect the data body (e.g., adding the data body to the database, either in a new location or by overwriting a previous value or values). Processing also involves storing the timestamp that has been appended to the data body in the corresponding shard instance 108A-108C as a version for the shard instance. Once processing is complete for a shard instance 108A-108C, the shard instance 108A-108C sends an acknowledgement.

In an example embodiment, there is no need to wait for all shard instances 108A-108C to acknowledge that the write request has been processed successfully. Rather, as long as more than n/2 of the write requests process successfully, this is enough to keep strong data consistency, where n is the number of shard instances (here 3). In essence, more than n/2 when n is odd is the same as being at least as large as the first integer greater than n/2.

Figure 3:
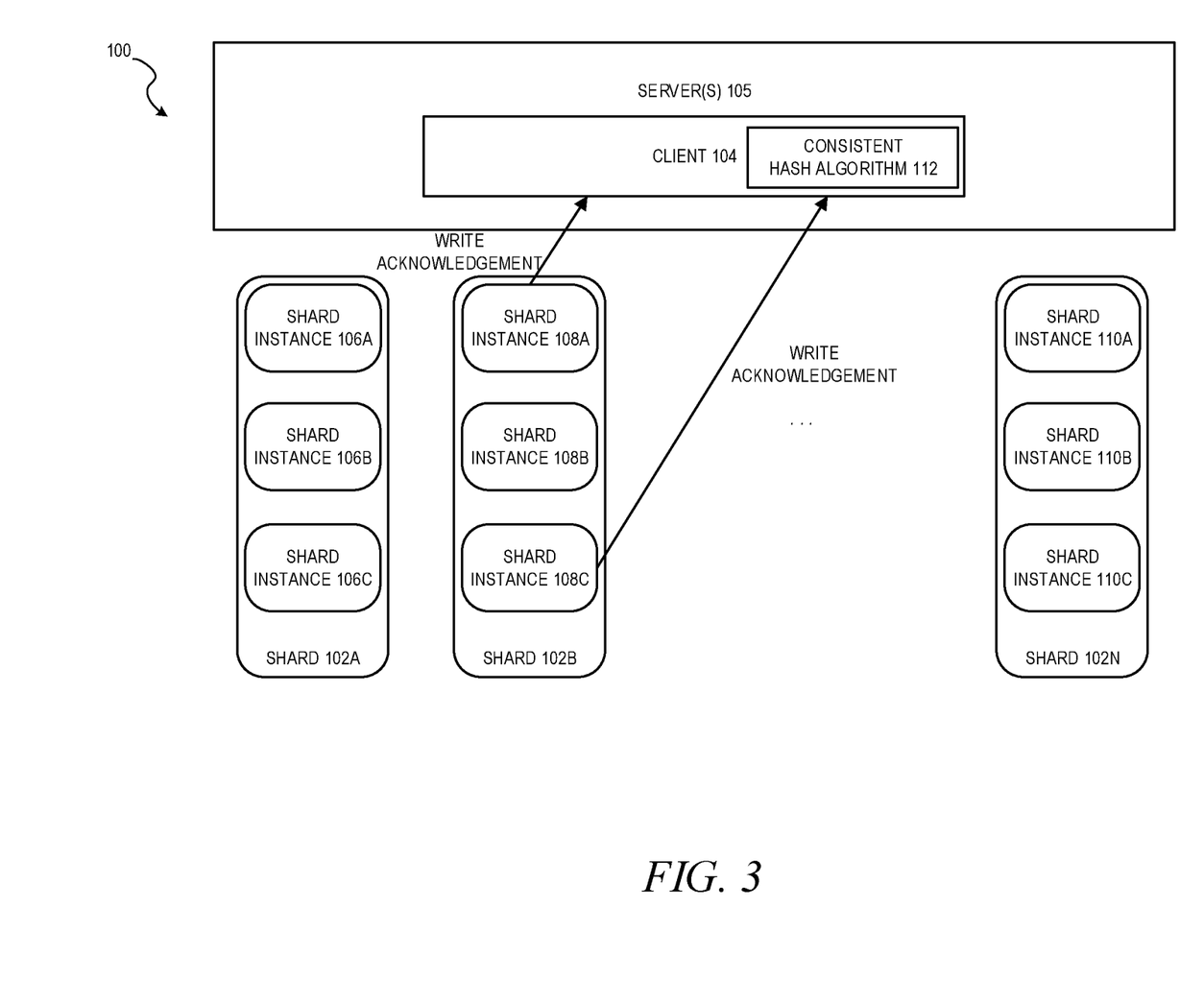
FIG. 3 is a block diagram illustrating an in-memory database cluster structure during an acknowledgement of a put operation, in accordance with an example embodiment.

FIG. 3 is a block diagram illustrating an in-memory database cluster structure 100 during an acknowledgement of a put operation, in accordance with an example embodiment. Here, client 104 has received acknowledgements of the put operations sent in FIG. 2 from shard instances 108A and 108C, but not from shard instance 108B (either because shard instance 108B has not sent it yet, such as due to a processing error or an outage, or because shard instance 108B has sent it but it has not yet been received, such as due to heavy traffic or communications outage). Here, however, since two out of the three shard instances 108A-108C have acknowledged the put operation, this satisfies the greater than n/2 threshold.

Database management software often tracks response times of database operations to identify any issues that may be occurring. In a traditional leader-follower architecture, the response time is based on the response time of all the shard instances. Here, however, part of the solution allows for fewer than all shard instances to respond at all. Hence, the response time measurement may be modified to be a median of instance response times of all shard instances in a shard. Thus, for example, if shard instance 108A had a response time of 10 ms and shard instance 108C had a response time of 11 ms, then after 11 ms has elapsed, there is no need to wait for the response time for shard instance 108B to be learned, as it will not affect the median value, which would be 11 ms. Regardless of whether shard instance 108B had a response time of 15 ms, 20 ms, or infinite (no response), the median value does not change.

Figure 4:
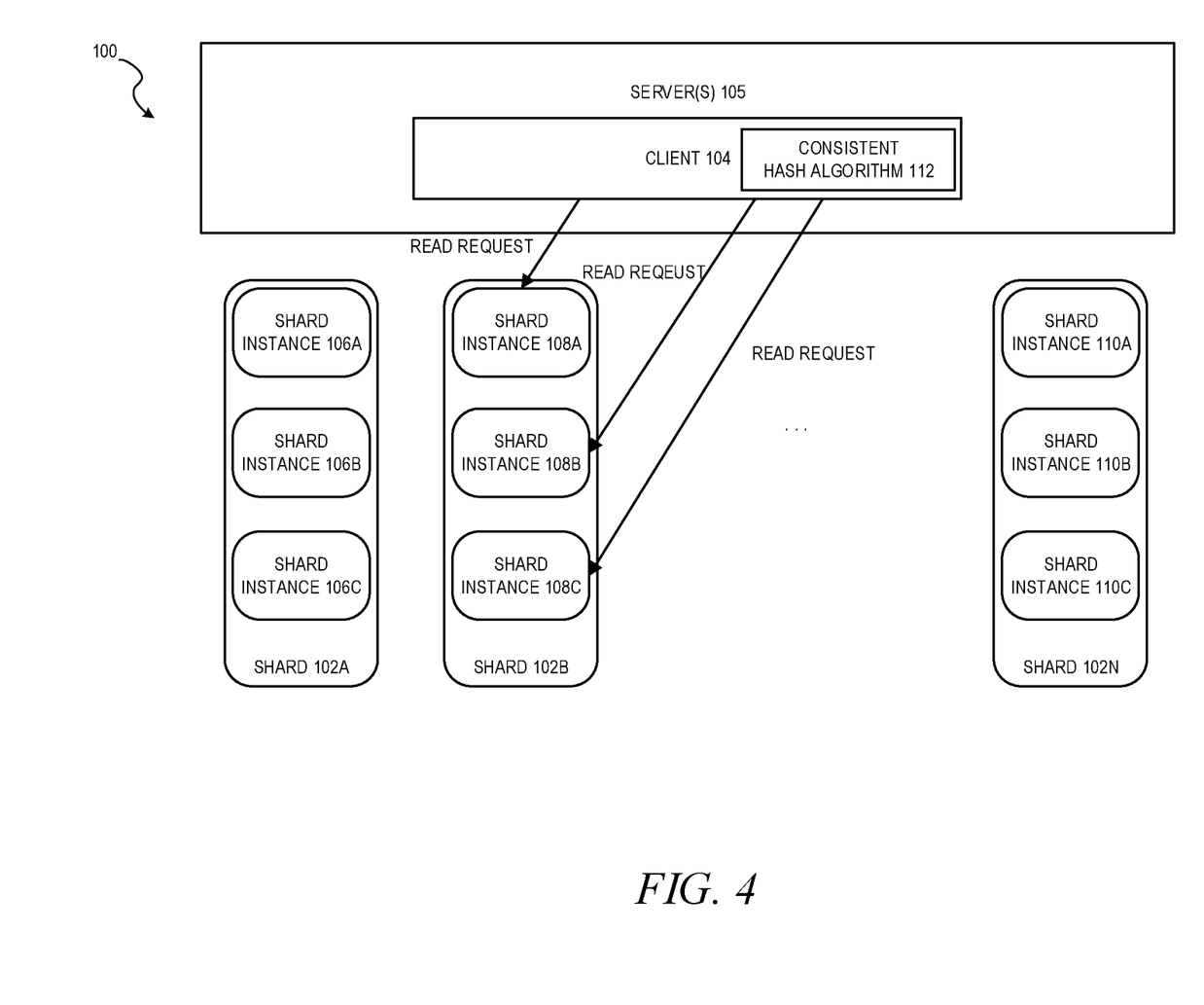
FIG. 4 is a block diagram illustrating an in-memory database cluster structure during a get operation, in accordance with an example embodiment.

Turning now to a read request, FIG. 4 is a block diagram illustrating an in-memory database cluster structure 100 during a get operation, in accordance with an example embodiment. Here, like with FIG. 2, the client 104 uses consistent hash algorithm 112 to determine that shard 102B should receive the operation. No appending of a timestamp is performed by the client 104, however, and the get operation is sent to each shard instance 108A-108C in shard 102B in parallel, since there is no leader/follower setup. Each shard instance 108A-108C processes the get operation by retrieving the requested value(s) and appending the shard instance's 108A-108C version to the value(s), then returning the data to the client 104.

As with the put operation, in an example embodiment, there is no need to wait for all shard instances 108A-108C to actually return the data. Rather, as long as n/2 of the read requests process successfully, this is enough to trust the data, where n is the number of shard instances (here 3), assuming some additional processing is performed to ensure that the latest version's data is actually used.

Figure 5:
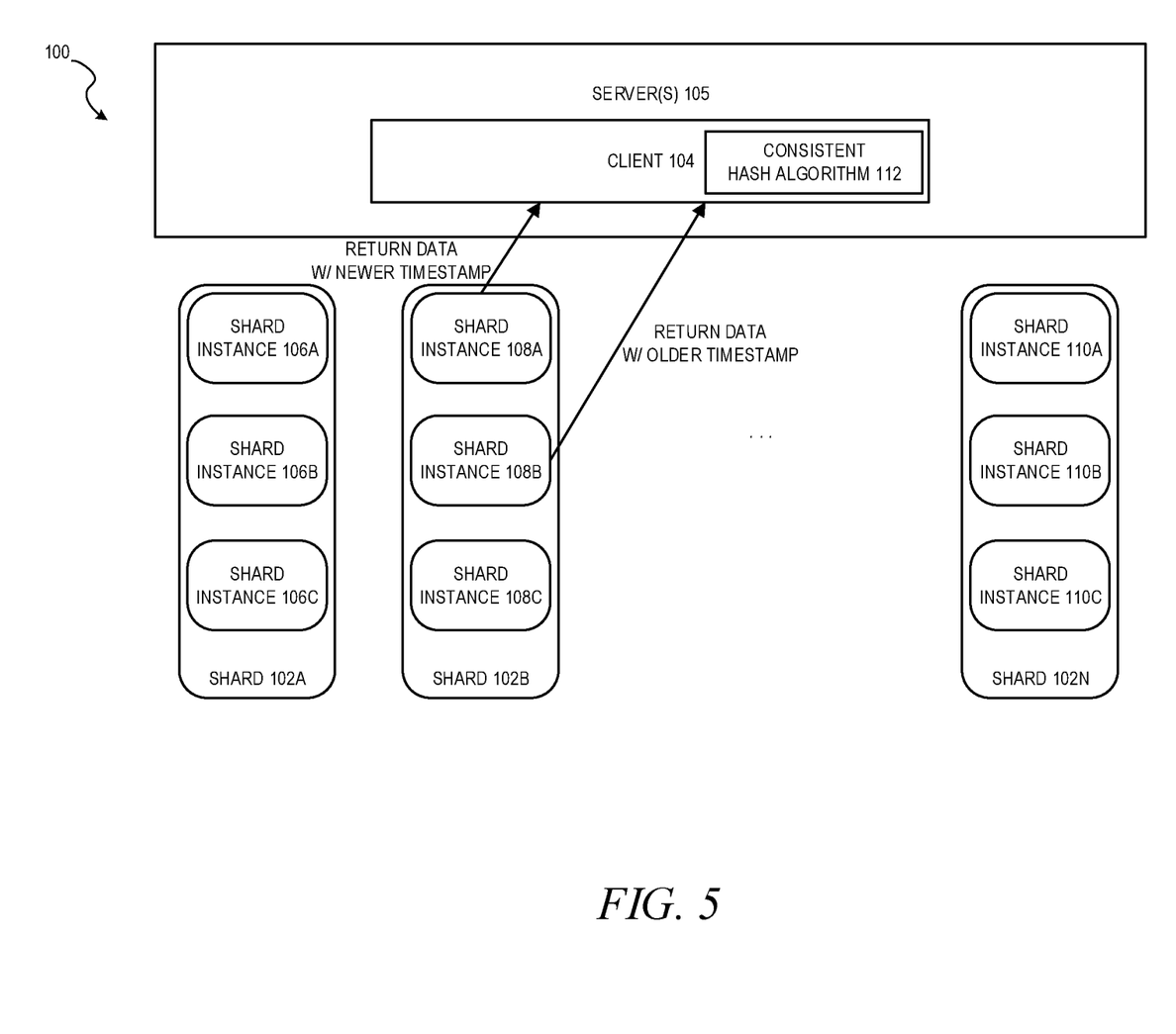
FIG. 5 is a block diagram illustrating an in-memory database cluster structure during an acknowledgement of a get operation, in accordance with an example embodiment.

FIG. 5 is a block diagram illustrating an in-memory database cluster structure 100 during an acknowledgement of a get operation, in accordance with an example embodiment. Here, client 104 has received data in response to the get operations sent in FIG. 2 from shard instances 108A and 108B, but not from shard instance 108C (either because shard instance 108C has not sent it yet, such as due to a processing error or an outage, or because shard instance 108C has sent it but it has not yet been received yet, such as due to heavy traffic or communications outage). Here, however, since two out of the three shard instances 108A-108C have returned data, this satisfies the greater than n/2 standard. As mentioned previously, the client 104 knows the number of shard instances (n) by virtue of knowing the entire cluster structure, or by querying an external source for that information at runtime.

There are two possibilities. The first is that all of the n/2 data bodies returned are identical. If that is the case, then any of these data values can be deemed as the correct value. The second is that not all of the n/2 data bodies are identical (i.e., at least one is different). If that is the case, then additional processing is performed. The timestamp appended to each of the returned data bodies is examined and compared with one another. The data body having the latest timestamp value is selected as the correct value and can be deemed as such. FIG. 5 depicts a case where not all of the n/2 data bodies are identical. Here, the data body returned from shard instance 108A is different than the data body returned from shard instance 108B. The timestamp appended to the data body returned from shard instance 108A, however, is newer than the timestamp appended to the data body returned from shard instance 108B. Thus, the value(s) in the data body returned by shard instance 108A is selected as the correct one.

Figure 6:
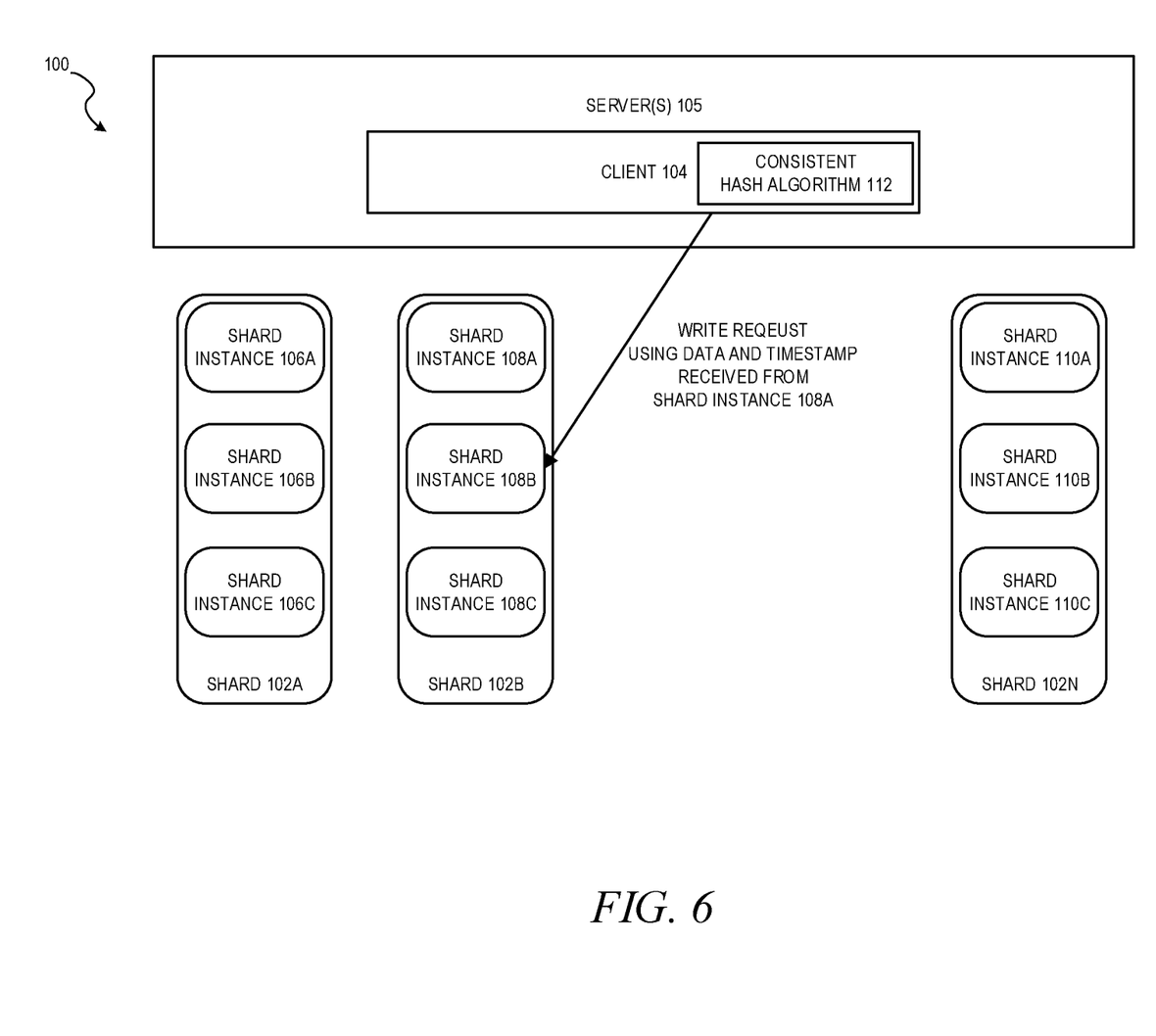
FIG. 6 is a block diagram illustrating an in-memory database cluster structure during a put operation using a latest version's data body, in accordance with an example embodiment.

Once the latest version is determined and the correct one is used, the client 104 then performs a write operation to update all of the other shard instances that had older versions with the new version. In an example embodiment, any shard instance that sent an older version is sent a write operation with the data body from the shard instance with the newest version. FIG. 6 is a block diagram illustrating an in-memory database cluster structure 100 during a put operation using a latest version's data body, in accordance with an example embodiment. Here, since it was determined in FIG. 5 that the data body from shard instance 108A was the correct one because its corresponding timestamp was the newest, and no data body was received from shard instance 108C, then client 104 sends a put operation to shard instance 108B to update it with the data body received from shard instance 108A. This may be called "data completion." Thus, shard instances 108A-108C do not need to communicate directly with each other to replicate their data, but rely upon client 104 to do the communication and ensure synchronized replication (with the exception of a rebooted instance, as described below). It should be noted that, in some example embodiments, the client 104 may elect to also update shard instance 108C even though shard instance 108C did not return any data body in response to the original get operation.

If an instance crash occurs in one shard, then that shard instance can be rebooted and it may then execute a synchronize script to repair its data. A synchronize script is a code routing that reads the value(s) from all the other instances in the same shard, and writes the latest data into the restarted instance. This essentially performs the same data completion operation as described with respect to FIG. 6, but from the restarted instance instead of from the client 104. After reboot and repair of the crashed instance, the instance will hold the latest data, in order to provide strong data consistency.

This solution provides a good balance between operation response time and data consistency. Typically, the cluster will reside all in the same data center, and sometimes even in the same local area network, so the median of all instance latency is almost the same as a single instance latency. Thus, the response time is similar to prior solutions, but the present solution also provides stronger data consistency. Further, by eliminating the leader-follower architecture, there is no downtime that occurs when a leader node goes down. Any instance that goes down will only affect itself, and there are enough other instances in the shard available to service any requests while the downed instance is restarted and rebooted. Thus, the shard continues working as expected. Additionally, there is no need to set up a sentinel component to watch all shard instances and take care of any failover operations. The failover can be handled automatically by the client without a sentinel component. There is also no need to configure data replication between a leader and a follower, as the client handles the replication and data completion, with the exception of the reboot procedure.

Figure 7:
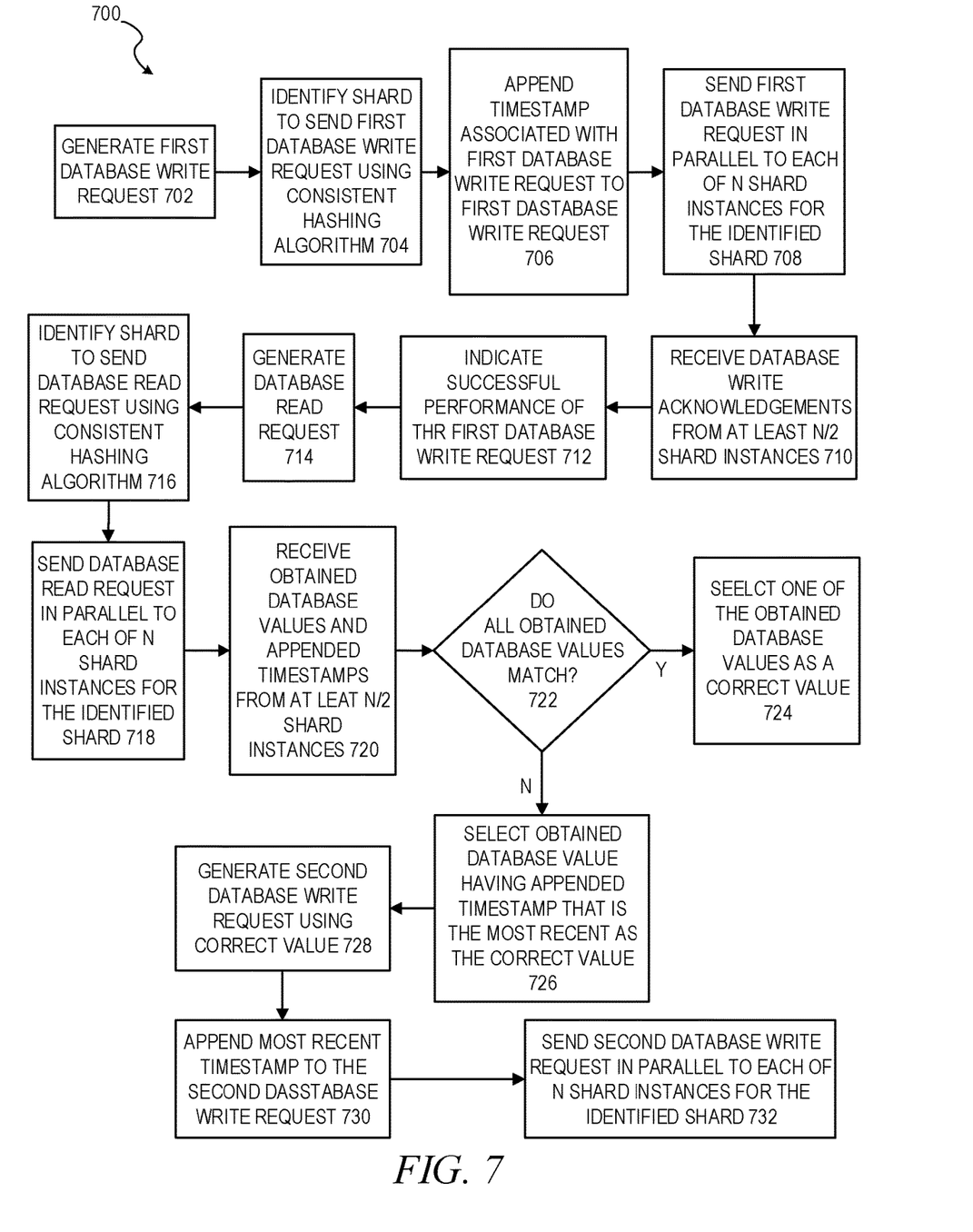
FIG. 7 is a flow diagram illustrating a method in accordance with an example embodiment.

FIG. 7 is a flow diagram illustrating a method 700 in accordance with an example embodiment. At operation 702, a first database write request is generated by a client. This may be, for example, a put operation. The operation may identify a value to add to a database (or a value to overwrite another value in the database with). At operation 704, a shard to which to send the first database write request is identified by passing a key corresponding to the client to a consistent hashing algorithm. As mentioned earlier, any of a number of different consistent hashing algorithms may be used for this purpose.

At operation 706, a timestamp associated with the first database write request is appended to the first database write request. The timestamp may be, for example, an indication of when the first database write request was generated, but it could also be an indication of a different time, such as when the value was created or received, or when the first database write request is being prepared to be sent to a shard. Notably, the timestamp should be appended prior to a read operation being performed for the data. If there is no timestamp available, then the data should be marked as inactive so that no read can occur.

At operation 708, the first database write request is sent in parallel to each of n shard instances for the identified shard. Here, n is an odd integer greater than or equal to three. The first database write request instructs each of the n shard instances to perform a database write on the corresponding shard instance in accordance with the first database write request and to store the timestamp as a version for the corresponding shard instance. As mentioned above, the client 104 knows the addresses of the shard instances by virtue of knowing the entire cluster structure, or by querying an external source at runtime.

At operation 710, database write acknowledgments are received from at least n/2 of the shard instances. At operation 712, in response to the receiving, the successful performance of the first database write request is indicated. At operation 714, a database read request is generated by the client. This may be, for example, a get operation. At operation 716, the shard to which to send the database read request is identified by passing the key corresponding to the client to the consistent hashing algorithm.

At operation 718, the database read request is sent in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client.

At operation 720, obtained database values and appended timestamps are received from at least n/2 of the shard instances. At operation 722, it is determined whether the received obtained database values are all equal to each other. If so, then at operation 724, one of the obtained database values is selected as a correct value. If not, then at operation 726 an obtained database value having an appended timestamp that is the most recent of all the appended timestamps is selected as a correct value. At operation 728, a second database write request including the correct value is generated. At operation 730, the timestamp that is the most recent of all the appended timestamps is appended to the second database write request. Then, at operation 732, the second database write request is sent in parallel to at least n/2-1 of the n shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

It should be noted that in another example embodiment, the second database write request is sent to all the n shard instances except the one from which the database value with the latest timestamp was received.

In view of the above-described implementations of subject matter, this application discloses the following list of examples, wherein one feature of an example in isolation or more than one feature of said example taken in combination and, optionally, in combination with one or more features of one or more further examples are further examples also falling within the disclosure of this application:

Example 1. A system comprising:
at least one hardware processor; and
a computer-readable medium storing instructions that, when executed by the at least one hardware processor, cause the at least one hardware processor to perform operations comprising:
generating, by a client, a first database write request;
identifying a shard to which to send the first database write request by passing a key corresponding to the client to a consistent hashing algorithm;
appending a timestamp associated with the first database write request to the first database write request;
sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;
receiving database write acknowledgments from at least n/2 of the shard instances; and
in response to the receiving, indicating that the first database write request has been successfully performed.

Example 2. The system of Example 1, wherein the operations further comprise:
generating, by the client, a database read request;
identifying the shard to which to send the database read request by passing the key corresponding to the client to the consistent hashing algorithm;
sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;
receiving obtained database values and appended timestamps from at least n/2 of the shard instances;
determining whether the received obtained database values are all equal to each other;
in response to a determination that the received obtained database values are not all equal to each other:
selecting an obtained database value having an appended timestamp that is the most recent of all the appended timestamps as a correct value;
generating a second database write request including the correct value;
appending the timestamp that is the most recent of all the appended timestamps to the second database write request;
sending the second database write request in parallel to each of the n shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

Example 3. The system of Examples 1 or 2, wherein the identified shard is a shard of an in-memory database.

Example 4. The system of any of Examples 1-3, wherein the identified shard is a shard of a disk-based memory database.

Example 5. The system of any of Examples 1-4, wherein the client is a client of a session service and the key is a session identification for the client.

Example 6. The system of any of Examples 1-5, wherein the operations further comprise:
determining a response time for the first database write request by taking a median of all response times of each of then shard instances in response to sending the first database write request.

Example 7. The system of any of Examples 1-6, wherein the shard is one of a plurality of shards horizontally dividing a database.

Example 8. A method comprising:
generating, by a client, a first database write request;
identifying a shard to which to send the first database write request by passing a key corresponding to the client to a consistent hashing algorithm;
appending a timestamp associated with the first database write request to the first database write request;

sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;

receiving database write acknowledgments from at least n/2 of the shard instances; and in response to the receiving, indicating that the first database write request has been successfully performed.

Example 9. The method of Example 8, further comprising:

generating, by the client, a database read request;

identifying the shard to which to send the database read request by passing the key corresponding to the client to the consistent hashing algorithm;

sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;

receiving obtained database values and appended timestamps from at least n/2 of the shard instances;

determining whether the received obtained database values are all equal to each other;

in response to a determination that the received obtained database values are not all equal to each other:

selecting an obtained database value having an appended timestamp that is the most recent of all the appended timestamps as a correct value;

generating a second database write request including the correct value;

appending the timestamp that is the most recent of all the appended timestamps to the second database write request;

sending the second database write request in parallel to each of the n shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

Example 10. The method of Examples 8 or 9, wherein the identified shard is a shard of an in-memory database.

Example 11. The method of any of Examples 8-10, wherein the identified shard is a shard of a disk-based memory database.

Example 12. The method of any of Examples 8-11, wherein the client is a client of a session service and the key is a session identification for the client.

Example 13. The method of any of Examples 8-12, further comprising:

determining a response time for the first database write request by taking a median of all response times of each of then shard instances in response to sending the first database write request.

Example 14. The method of any of Examples 8-13, wherein the shard is one of a plurality of shards horizontally dividing a database.

Example 15. A non-transitory machine-readable medium storing instructions which, when executed by one or more processors, cause the one or more processors to perform operations comprising:

generating, by a client, a first database write request;

identifying a shard to which to send the first database write request by passing a key corresponding to the client to a consistent hashing algorithm;

appending a timestamp associated with the first database write request to the first database write request;

sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;

receiving database write acknowledgments from at least n/2 of the shard instances; and in response to the receiving, indicating that the first database write request has been successfully performed.

Example 16. The non-transitory machine-readable medium of Example 15, wherein the operations further comprise:

generating, by the client, a database read request;

identifying the shard to which to send the database read request by passing the key corresponding to the client to the consistent hashing algorithm;

sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;

receiving obtained database values and appended timestamps from at least n/2 of the shard instances;

determining whether the received obtained database values are all equal to each other;

in response to a determination that the received obtained database values are not all equal to each other:

selecting an obtained database value having an appended timestamp that is the most recent of all the appended timestamps as a correct value;

generating a second database write request including the correct value;

appending the timestamp that is the most recent of all the appended timestamps to the second database write request;

sending the second database write request in parallel to each of the n shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

Example 17. The non-transitory machine-readable medium of Example 15 or 16, wherein the identified shard is a shard of an in-memory database.

Example 18. The non-transitory machine-readable medium of any of Examples 15-17, wherein the identified shard is a shard of a disk-based memory database.

Example 19. The non-transitory machine-readable medium of any of Examples 15-18, wherein the client is a client of a session service and the key is a session identification for the client.

Example 20. The non-transitory machine-readable medium of any of Examples 15-19, wherein the operations further comprise:

determining a response time for the first database write request by taking a median of all response times of each of then shard instances in response to sending the first database write request.

Figure 8:
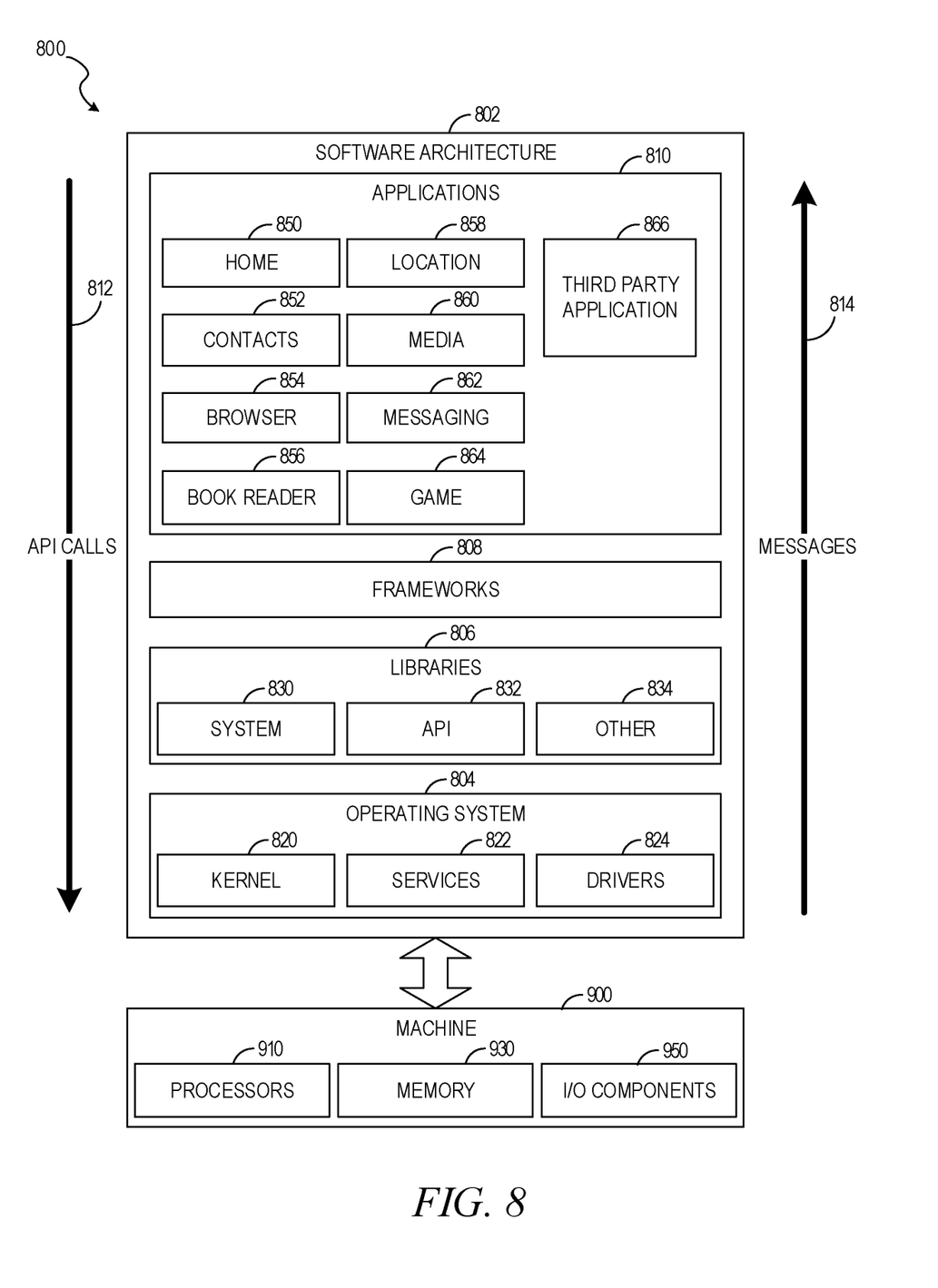
FIG. 8 is a block diagram illustrating a software architecture, which can be installed on any one or more of the devices described above.

FIG. 8 is a block diagram 800 illustrating a software architecture 802, which can be installed on any one or more of the devices described above. FIG. 8 is merely a non-limiting example of a software architecture, and it will be appreciated that many other architectures can be implemented to facilitate the functionality described herein. In various embodiments, the software architecture 802 is implemented by hardware such as a machine 900 of FIG. 9 that includes processors 910, memory 930, and input/output (I/O) components 950. In this example architecture, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke Application Program Interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware. For instance, the drivers 824 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications, such as a third-party application 866. The applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 866 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 866 can invoke the API calls 812 provided by the operating system 804 to facilitate functionality described herein.

Figure 9:
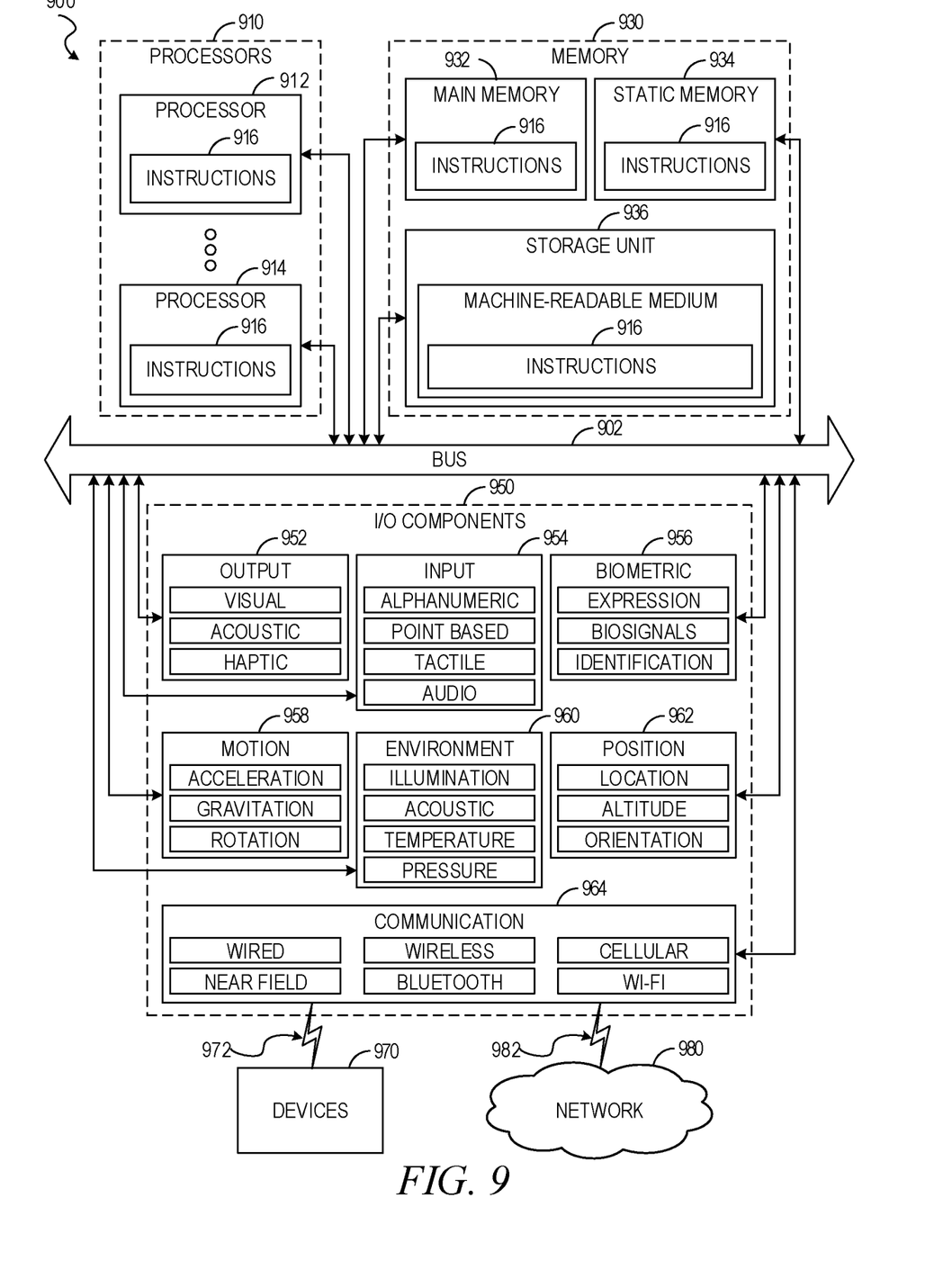
FIG. 9 illustrates a diagrammatic representation of a machine in the form of a computer system within which a set of instructions may be executed for causing the machine to perform any one or more of the methodologies discussed herein.

FIG. 9 illustrates a diagrammatic representation of a machine 900 in the form of a computer system within which a set of instructions may be executed for causing the machine 900 to perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein may be executed. For example, the instructions 916 may cause the machine 900 to execute the method of FIG. 7. Additionally, or alternatively, the instructions 916 may implement FIGS. 1-7 and so forth. The instructions 916 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

The machine 900 may include processors 910, memory 930, and I/O components 950, which may be configured to communicate with each other such as via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 912 and a processor 914 that may execute the instructions 916. The term "processor" is intended to include multi-core processors that may comprise two or more independent processors (sometimes referred to as "cores") that may execute instructions 916 contemporaneously. Although FIG. 9 shows multiple processors 910, the machine 900 may include a single processor 912 with a single core, a single processor 912 with multiple cores (e.g., a multi-core processor 912), multiple processors 912, 914 with a single core, multiple processors 912, 914 with multiple cores, or any combination thereof.

The memory 930 may include a main memory 932, a static memory 934, and a storage unit 936, each accessible to the processors 910 such as via the bus 902. The main memory 932, the static memory 934, and the storage unit 936 store the instructions 916 embodying any one or more of the methodologies or functions described herein. The instructions 916 may also reside, completely or partially, within the main memory 932, within the static memory 934, within the storage unit 936, within at least one of the processors 910 (e.g., within the processor's cache memory), or any suitable combination thereof, during execution thereof by the machine 900.

The I/O components 950 may include a wide variety of components to receive input, provide output, produce output, transmit information, exchange information, capture measurements, and so on. The specific I/O components 950 that are included in a particular machine will depend on the type of machine. For example, portable machines such as mobile phones will likely include a touch input device or other such input mechanisms, while a headless server machine will likely not include such a touch input device. It will be appreciated that the I/O components 950 may include many other components that are not shown in FIG. 9. The I/O components 950 are grouped according to functionality merely for simplifying the following discussion, and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environmental components 960, or position components 962, among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environmental components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 962 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972, respectively. For example, the communication components 964 may include a network interface component or another suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., coupled via a USB).

Moreover, the communication components 964 may detect identifiers or include components operable to detect identifiers. For example, the communication components 964 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

The various memories (i.e., 930, 932, 934, and/or memory of the processor(s) 910) and/or the storage unit 936 may store one or more sets of instructions 916 and data structures (e.g., software) embodying or utilized by any one or more of the methodologies or functions described herein. These instructions (e.g., the instructions 916), when executed by the processor(s) 910, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 916 may be transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, the instructions 916 may be transmitted or received using a transmission medium via the coupling 972 (e.g., a peer-to-peer coupling) to the devices 970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 916 for execution by the machine 900, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   generating, by a client, a first database write request;
   identifying a shard to which to send the first database write request by passing a key corresponding to the client to a consistent hashing algorithm;
   appending a timestamp associated with the first database write request to the first database write request;
   sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;
   receiving database write acknowledgments from more than n/2 of the shard instances; and
   in response to the receiving, indicating that the first database write request has been successfully performed.

2. The system of claim 1, wherein the operations further comprise:
   generating, by the client, a database read request;
   identifying the shard to which to send the database read request by passing the key corresponding to the client to the consistent hashing algorithm;
   sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;

receiving obtained database values and appended timestamps from at least n/2 of the shard instances; and determining whether the received obtained database values are all equal to each other.

3. The system of claim 2, wherein the operations further comprise:

in response to a determination that the received obtained database values are not all equal to each other:
  selecting an obtained database value having an appended timestamp that is a most recent of all the appended timestamps as a correct value;
  generating a second database write request including the correct value;
  appending the timestamp that is the most recent of all the appended timestamps to the second database write request; and
  sending the second database write request in parallel to at least n/2-1 shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

4. The system of claim 1, wherein a value for n is accessible to the client by virtue of the client storing a cluster structure including an address for each of n shard instances for the identified shard.

5. The system of claim 1, wherein the client is a client of a session service and the key is a session identification for the client.

6. The system of claim 1, wherein the operations further comprise:
  determining a response time for the first database write request by calculating a median of all response times of each of then shard instances in response to sending the first database write request, the calculating performed without obtaining a response time for at least one of the n shard instances.

7. The system of claim 1, wherein the shard is one of a plurality of shards horizontally dividing a database.

8. A method comprising:
  generating, by a client, a first database write request;
  identifying a shard to which to send the first database write request by passing a key corresponding to the client to a consistent hashing algorithm;
  appending a timestamp associated with the first database write request to the first database write request;
  sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;
  receiving database write acknowledgments from at least n/2 of the shard instances; and in response to the receiving, indicating that the first database write request has been successfully performed.

9. The method of claim 8, further comprising:
  generating, by the client, a database read request;
  identifying the shard to which to send the database read request by passing the key corresponding to the client to the consistent hashing algorithm;
  sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;
  receiving obtained database values and appended timestamps from at least n/2 of the shard instances;
  determining whether the received obtained database values are all equal to each other;
  in response to a determination that the received obtained database values are not all equal to each other:
    selecting an obtained database value having an appended timestamp that is a most recent of all the appended timestamps as a correct value;
    generating a second database write request including the correct value;
    appending the timestamp that is the most recent of all the appended timestamps to the second database write request;
    sending the second database write request in parallel to at least n/2-1 shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

10. The method of claim 8, wherein the identified shard is a shard of an in-memory database.

11. The method of claim 8, wherein the identified shard is a shard of a disk-based memory database.

12. The method of claim 8, wherein the client is a client of a session service and the key is a session identification for the client.

13. The method of claim 8, further comprising:
  determining a response time for the first database write request by taking a median of all response times of each of then shard instances in response to sending the first database write request.

14. The method of claim 8, wherein the shard is one of a plurality of shards horizontally dividing a database.

15. A non-transitory machine-readable medium storing instructions which, when executed by one or more processors, cause the one or more processors to perform operations comprising:
  generating, by a client, a first database write request;
  identifying a shard to which to send the first database write request by passing a key corresponding to the client to a consistent hashing algorithm;
  appending a timestamp associated with the first database write request to the first database write request;

sending the first database write request in parallel to each of n shard instances for the identified shard, wherein n is an odd integer greater than or equal to three, the first database write request instructing each of the n shard instances to perform a database write on the corresponding shard instance in accordance with the first database write request and also to store the timestamp as a version for the corresponding shard instance;

receiving database write acknowledgments from at least n/2 of the shard instances; and in response to the receiving, indicating that the first database write request has been successfully performed.

16. The non-transitory machine-readable medium of claim 15, wherein the operations further comprise:

generating, by the client, a database read request;

identifying the shard to which to send the database read request by passing the key corresponding to the client to the consistent hashing algorithm;

sending the database read request in parallel to each of the n shard instances for the identified shard, instructing each of the n shard instances to perform a database read on the corresponding shard instance in accordance with the database read request to obtain a database value, append the stored timestamp for the corresponding shard instance to the obtained database value, and return the obtained database value and appended timestamp to the client;

receiving obtained database values and appended timestamps from at least n/2 of the shard instances;

determining whether the received obtained database values are all equal to each other; and in response to a determination that the received obtained database values are not all equal to each other:

selecting an obtained database value having an appended timestamp that is a most recent of all the appended timestamps as a correct value;

generating a second database write request including the correct value;

appending the timestamp that is the most recent of all the appended timestamps to the second database write request; and sending the second database write request in parallel to at least n/2-1 shard instances from which the database values and appended timestamps have been received but whose appended timestamps are not the most recent of all the appended timestamps, instructing each to perform a database write on the corresponding shard instance in accordance with the second database write request and to store the timestamp appended to the second database write request as a version for the corresponding shard instance.

17. The non-transitory machine-readable medium of claim 15, wherein the identified shard is a shard of an in-memory database.

18. The non-transitory machine-readable medium of claim 15, wherein the identified shard is a shard of a disk-based memory database.

19. The non-transitory machine-readable medium of claim 15, wherein the client is a client of a session service and the key is a session identification for the client.

20. The non-transitory machine-readable medium of claim 15, wherein the operations further comprise:

determining a response time for the first database write request by taking a median of all response times of each of then shard instances in response to sending the first database write request.

* * * * *